(12) United States Patent
Hinrichs et al.

(10) Patent No.: US 10,409,724 B2
(45) Date of Patent: *Sep. 10, 2019

(54) SELECTIVE DOWNSTREAM CACHE PROCESSING FOR DATA ACCESS

(71) Applicant: International Business Machines Corporation, Armonk, NY (US)

(72) Inventors: Willm Hinrichs, Holzgerlingen (DE); Markus Kaltenbach, Holzgerlingen (DE); Eyal Naor, Tel Aviv (IL); Martin Recktenwald, Schoenaich (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/813,751

(22) Filed: Nov. 15, 2017

(65) Prior Publication Data

US 2019/0018773 A1 Jan. 17, 2019

Related U.S. Application Data

(60) Provisional application No. 15/649,186, filed on Jul. 13, 2017.

(51) Int. Cl.
*G06F 12/00* (2006.01)
*G06F 12/0817* (2016.01)
*G06F 9/46* (2006.01)
*G06F 12/0811* (2016.01)

(52) U.S. Cl.
CPC ......... *G06F 12/0828* (2013.01); *G06F 9/467* (2013.01); *G06F 12/0811* (2013.01); *G06F 2212/60* (2013.01); *G06F 2212/621* (2013.01)

(58) Field of Classification Search
CPC .. G06F 12/0828; G06F 12/0811; G06F 9/467; G06F 2212/60; G06F 2212/621; G06F 9/383

See application file for complete search history.

(56) References Cited

U.S. PATENT DOCUMENTS

| 6,247,094 | B1 * | 6/2001 | Kumar ............... G06F 12/0862 711/118 |
| 6,678,795 | B1 | 1/2004 | Moreno et al. |
| 9,250,915 | B2 | 2/2016 | Jacobi et al. |
| 9,384,131 | B2 | 7/2016 | Habermann et al. |
| 2004/0215882 | A1 | 10/2004 | Alexander et al. |
| 2007/0186073 | A1 * | 8/2007 | Luick ............... G06F 12/0855 711/169 |
| 2008/0243739 | A1 | 10/2008 | Tsien |
| 2009/0024835 | A1 | 1/2009 | Fertig et al. |
| 2009/0172360 | A1 | 7/2009 | Hikichi |

(Continued)

OTHER PUBLICATIONS

Yoaz et al. "Speculation Techniques for Improving Load Related Instruction Scheduling", 1999, IEEE (Year: 1999).*

(Continued)

*Primary Examiner* — Arvind Talukdar
(74) *Attorney, Agent, or Firm* — Robert J. Shatto

(57) ABSTRACT

A first request is received to access a first set of data in a first cache. A likelihood that a second request to a second cache for the first set of data will be canceled is determined. Access to the first set of data is completed based on the determining the likelihood that the second request to the second cache for the first set of data will be canceled.

4 Claims, 8 Drawing Sheets

(56) References Cited

U.S. PATENT DOCUMENTS

| | | | |
|---|---|---|---|
| 2012/0072702 A1 | 3/2012 | Pierson et al. | |
| 2012/0102269 A1 | 4/2012 | Ono et al. | |
| 2013/0132680 A1 | 5/2013 | Peleg | |
| 2013/0246708 A1 | 9/2013 | Ono et al. | |
| 2014/0143492 A1* | 5/2014 | Eckert | G06F 12/0802 711/118 |
| 2014/0181407 A1 | 6/2014 | Crum et al. | |
| 2014/0297965 A1 | 10/2014 | Jayaseelan et al. | |
| 2019/0018772 A1 | 1/2019 | Hinrichs et al. | |

OTHER PUBLICATIONS

Zhu et al., "Access-Mode Predictors for Low-Power Cache Design", 2002,IEEE (Year: 2002).*

Powell et al., "Reducing Set-Associative Cache Energy via Way Prediction and Selective Direct Mapping", 2001, IEEE (Year: 2001).*

Calder et al., "Predictive Sequential Associative Cache," HPCA '96: Proceedings of the 2nd International Symposium on High Performance Computer Architecture, Feb. 1996, 10 pages.

Hinrichs, et al., "Selective Downstream Cache Processing for Data Access," U.S. Appl. No. 15/649,186, filed Jul. 13, 2017.

List of IBM Patents or Patent Applications Treated as Related, Nov. 15, 2017, 2 pgs.

Accelerated Examination Support Document, U.S. Appl. No. 15/887,026, signed Feb. 1, 2018, 25 pgs.

Hinrichs et al., "Selective Downstream Cache Processing for Data Access," U.S. Appl. No. 15/887,026, filed Feb. 2, 2018.

List of IBM Patents or Patent Applications Treated as Related, Jan. 31, 2018, 2 pgs.

Accelerated Examination Support Document, U.S. Appl. No. 16/358,438, signed Mar. 12, 2019, 28 pgs.

Hinrichs et al., "Selective Downstream Cache Processing for Data Access," U.S. Appl. No. 16/358,438, filed Mar. 19, 2019.

List of IBM Patents or Patent Applications Treated as Related, 14, 2019, 2 pgs.

* cited by examiner

SELECTIVE DOWNSTREAM CACHE PROCESSING FOR DATA ACCESS

BACKGROUND

The present disclosure relates to computing systems that employ one or more caches. More particularly, the present disclosure relates to completing data requests based on selective downstream cache processing.

Cache memories in a computing system can improve processor, application, and/or computing system performance by storing data (e.g., a computer instruction, or an operand of a computer instruction) in a memory that has a lower access latency (time to read or write data) as compared to other memories, such as a main memory (e.g., primary RAM) or a non-volatile storage device (e.g., a disk). Cache memory can be included in a processor, and/or between a processor and another memory (e.g., another cache memory and/or a main memory) and can store a copy of data otherwise stored in a main memory. For example, processors can include a local, or "Level 1" (L1), cache, and computing systems can include additional caches, such as "level 2" (L2) and "level 3" (L3) caches, between a processor (or, a local cache of a processor) and another memory (e.g., a main memory).

SUMMARY

Various embodiments are directed to a computer-implemented method, a system, and a computer program product. In some embodiments, the computer-implemented method includes receiving a first request to access a first set of data in a first cache. A likelihood may be determined that a second request to a second cache for the first set of data will be canceled. Access to the first set of data may be completed based on the determining the likelihood that the second request to the second cache for the first set of data will be canceled.

In some embodiments, a system comprises a computing device that includes a processor and at least a first cache and a second cache. The computing device further includes a set predictor configured to predict whether there will be a cache hit or cache miss within the first cache for a first set of data of a first request. The computing device further includes a request buffer configured to at least delay a second request to the second cache for the first set of data when the set predictor module predicts the cache hit, wherein the buffer does not delay the second request when the set predictor module predicts the cache miss. The computing device further includes a directory configured to at least indicate an actual cache hit or miss.

In some embodiments, A computer program product comprises computer readable storage medium having program instructions embodied therewith. The program instructions are readable or executable by a processor to perform a method. The method comprises receiving a first request to access a first set of data in a first memory. The method further comprises predicting whether there will likely be a hit or a miss in the first memory. The method also comprises initiating, in parallel with the predicting whether there will likely be the hit or the miss in the first memory, a determination of whether there is an actual hit or actual miss in the first memory. Moreover, the method comprises generating, based on the predicting, a first action to facilitate access of the first set of data, the generating of the first action occurring before completion of the determination of whether there is an actual hit or actual miss in the first memory.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
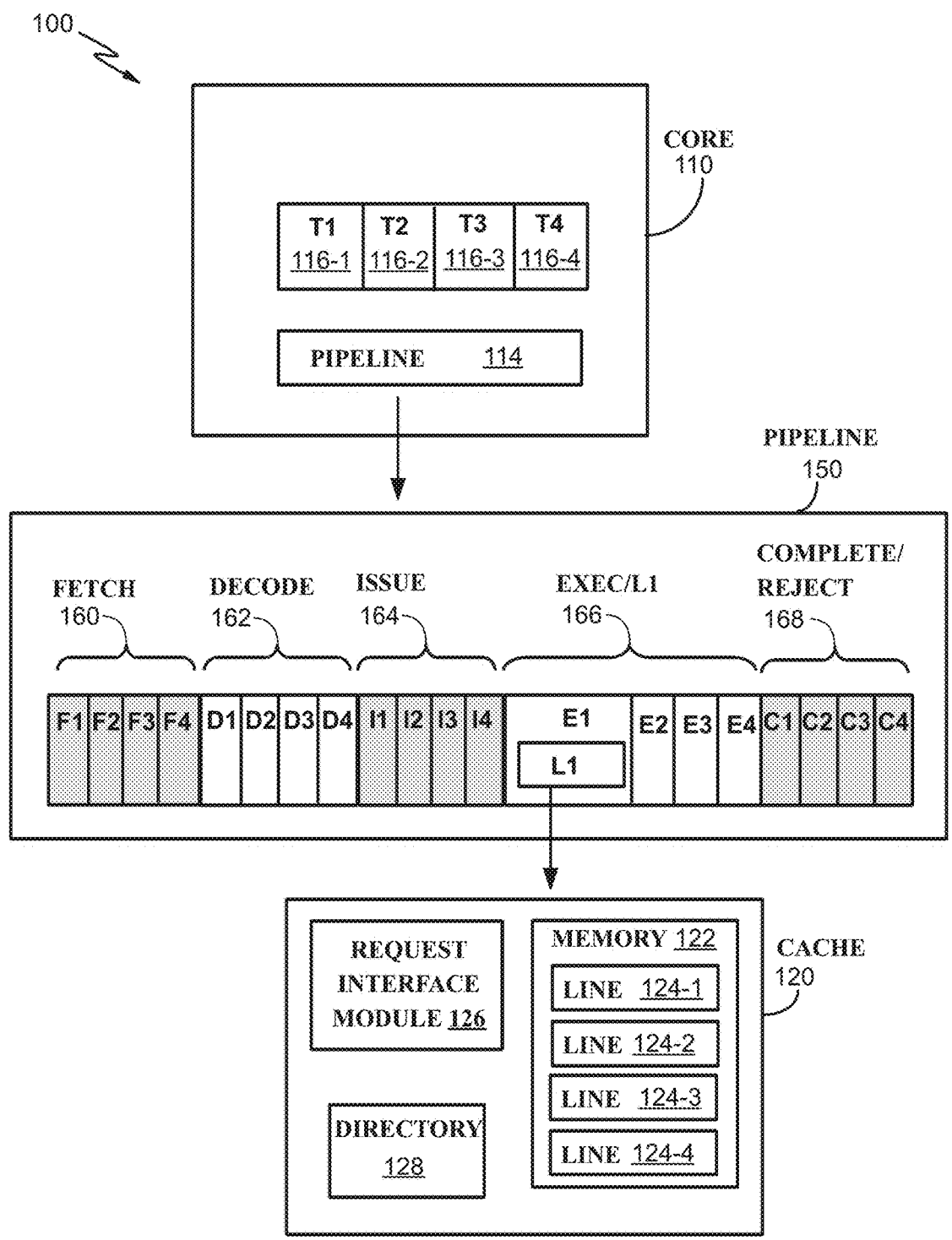
FIG. 1 is a block diagram of an example processing environment, according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to selective downstream cache processing for data access. While the present disclosure is not necessarily limited to such applications, various aspects of the disclosure may be appreciated through a discussion of various examples using this context.

A processor can determine if a copy of a cache line is included in a local cache, such as when the processor executes an instruction that references a memory location within a particular cache line. As used herein, "cache line" refers interchangeably to a location in a memory, and/or a cache, corresponding to a cache line of data, and data stored within that cache line, as will be clear from the context of the reference. If the cache line is stored ("cached") within a local cache, the processor can use data from within the cached copy of the cache line. When a particular set of data or cache line is stored to a particular cache, this is known as a cache "hit". If there is no cached copy of the data or cache line in a particular cache, the processor can incur a "cache miss". A cache "miss" in one level of memory (e.g., L1) can trigger a fetch request to another level of memory (e.g., L2). Accordingly, in response to the cache miss, the processor can fetch the cache line from the corresponding memory location, from another cache, and/or from another processor having a valid (e.g., an unmodified or, alternatively, most recently modified) copy of the cache line in a local cache.

Typical cache hit/miss processes may cause significant overhead. For example, final L2 cache hit/miss determinations (e.g., as looked up in a cache directory) may cause poor access latency performance such that it may take a long time to process a fetch request. Further, a fetch request to a higher level of cache after a lower level miss also takes a significant amount of time, particularly if it occurs after determining the actual hit/miss result. Moreover, some systems are prone to cancel a lot of fetch requests, which also take a significant quantity of time to process.

FIG. 1 is a block diagram of an example processing environment 100, according to embodiments. Core 110 comprises instruction pipeline 114 and processing threads 116-1-116-4 (collectively, "threads 116"). In embodiments, threads 116 can, for example, each record an execution context (e.g., various states and/or attributes) of a particular sequence of instructions executed by core 110.

In embodiments, a processor core can be a component of a processor chip, and the chip can include multiple cores of the same or different type. Embodiments can include one or more processor chips in a processor module. As used herein, in addition to a "processor" including a local cache, "processor" further refers, interchangeably to any of a thread, a core, a chip, a module, and/or any other configuration or combination thereof.

In embodiments, an instruction pipeline, such as pipeline 114, can enable a processor, such as core 110, to execute multiple instructions, each in various stages of execution, concurrently. To illustrate, pipeline 114 can be an instance of an instruction pipeline such as example pipeline 150. Pipeline 150 comprises a plurality of instruction processing stages for a processor to execute multiple instructions, or portions of a single instruction, concurrently. FIG. 1 depicts pipeline 150 as comprising "fetch" stage 160, comprising fetch units F1-F4; "decode" stage 162, comprising decode units D1-D4; "issue" stage 164, comprising issue units I1-I4; execution stage Exec/L1 stage 166, comprising execution units E1-E4; and instruction completion stage, complete/reject 168, comprising completion units C1-C4.

While example pipeline 150 is shown comprising 5 stages, each having four units, this is not intended to limit embodiments. Embodiments can include additional (or, fewer) stages, and/or stages within an execution pipeline can contain additional (or, fewer) units in each stage as compared to the example of FIG. 1 pipeline 150. "Deep" pipelines are examples of processor pipelines that can have pipeline stages, and/or units per stage, more than as shown in the example of FIG. 1. Likewise, while example cache 120 illustrates memory 122 comprising four cache line entries, this is not intended to limit embodiments.

In embodiments, instructions under execution by a core can proceed sequentially through an instruction pipeline, such as 150. Fetch stage 160 can fetch multiple instructions for execution using fetch units F1-F4. For example, instructions fetched by fetch stage 160 can proceed to decode stage 162, for concurrent decode using decode units D1-D4. Decoded instructions can be issued for execution via issue units I1-I4 of issue stage 164. Issued instructions can proceed to execution stage 166, and execution units E1-E4 can perform particular execution actions of those issued instructions, such as performing Arithmetic Logic Unit (ALU) or other computation unit operations, and/or loading or storing memory operands of the instructions. Completion units C1-C4 of complete/reject stage 168 can complete, and/or flush or terminate/cancel, instructions from other stages of pipeline 150. In embodiments, a pipelined processor can process a plurality of instructions, or portions of instructions, concurrently by means of the stages and units of the stages comprising an instruction pipeline.

Embodiments can utilize non-pipelined processors (e.g., multi-cycle processors), and these processors can include a local cache. If an operand is not cached in a local cache, the processor can initiate cache miss processing. In such non-pipelined embodiments, cache miss processing can further include stopping or delaying execution of instructions using those operands, and/or instructions that may depend on the results of instructions using those operands.

Alternative embodiments can utilize pipelined processors, such as illustrated in FIG. 1, and a local cache can be a component of a unit within the pipeline, such as a load/store unit of an instruction pipeline. For example, in FIG. 1, local cache L1 is shown as a component of execution unit (or, stage) E1 in execution pipe exec/L1 166. While not shown, embodiments can include multiple execution and/or other units of an instruction pipeline that can each include local (e.g., L1) caches. It is recognized that the exec/L1 166 stage does not necessarily need to include an "L1" level of cache. For example, the Exec 166 stage can include different levels (e.g., L2) or no levels at all.

In embodiments, L1 cache can be an instance of a cache such as illustrated by example cache 120. Cache 120 comprises a request interface module 126 and memory 122. Memory 122 includes cache lines 124-1-124-4 (collectively, "lines 124"), which can, in embodiments, store copies of cache lines in use by core 110. In some embodiments, the request interface module 126 performs one or more operations for cache hit/miss control, as explained in more detail below. In some embodiments, the request interface module 126 performs one or more operations associated with the execution steps 166 and/or the complete/reject steps 168.

The cache 120 also includes directory 128. In embodiments, the directory 128 records the identities (e.g., a memory address, or subset or hash thereof) of cache lines stored in the cache 120. The cache directory 128 can include other information about cache lines 124, such as most (or, alternatively, least) recent time it was referenced, or a number of times it has been referenced. The directory 128 can include a status associated with each of the cache lines 124 stored in the cache 120. Such status can include, for example, whether the cache line has shared vs. exclusive status, whether the cache line is valid (e.g., contains an unmodified, or most recently modified copy), which processor (e.g., which core within a processor chip if, for example, a local cache is shared by multiple cores), and other attributes of the cache line and/or its usage in the cache.

Execution units (e.g., E1) and/or other components (e.g., the request interface module 126) can determine, when using data in a cache line, whether the operands are stored in a local cache, such as L1 in E1. If it is determined that an operand is not cached in L1, the execution unit(s), the request interface module 126, and/or other components of core 110, can initiate cache miss processing. In embodiments, cache miss processing can further include stopping or delaying execution of instructions (or, portions of instructions) using those operands, and/or instructions that may depend on the results of instructions using those operands.

In some embodiments, a processor core, such as 110, can execute an instruction, or portions of an instruction, out of order and/or speculatively. Out of order execution can allow a processor to execute portions of an instruction or program as soon as an execution unit (e.g., a stage in a pipeline) is available, rather than delay execution to wait for completion of other portions of an instruction, or other instructions in a program. In this way, a processor can keep most or all of its execution units busy to improve computing throughput.

Speculative execution can allow a processor to execute an instruction, or a portion of an instruction, based on a likelihood that the processor will execute that instruction (or, portion thereof). For example, a processor can speculatively execute one or more instructions that follow a particular branch path in a program, prior to executing a conditional test that determines that path, based on a likelihood that the program will take that branch. In this way, a processor can utilize otherwise idle elements (e.g., stages of a pipeline) and can achieve higher computational throughput, in the event that the results of the speculatively-executed instruction (or portion thereof) can be used as other instructions (or, portions of an instruction) complete execution.

Figure 2:
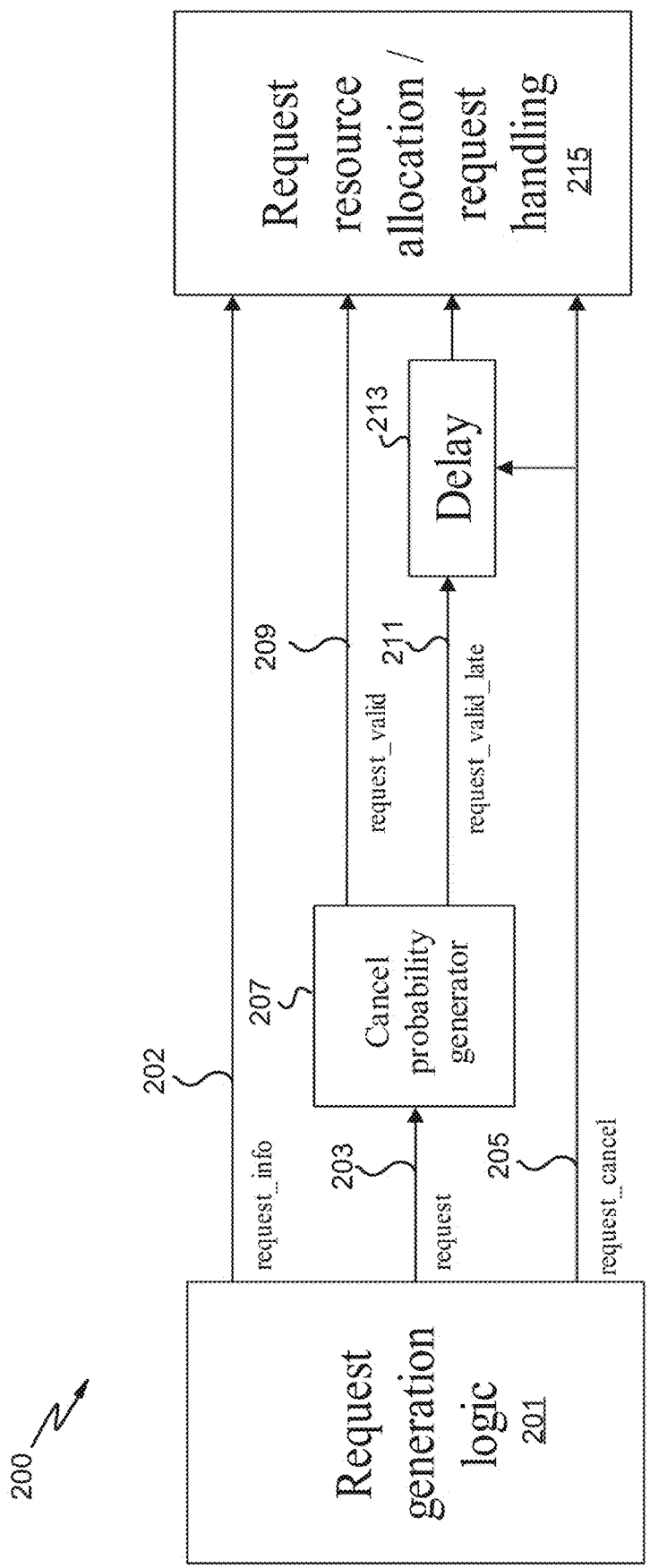
FIG. 2 is a block diagram of an example processing environment, according to embodiments.

FIG. 2 is a block diagram of an example processing environment 200, according to embodiments. In some embodiments, the processing environment 200 is or is included in the request interface module 126 of FIG. 1. In some embodiments, the processing environment 200 is associated with or part of the pipeline 150 of FIG. 1. The request generation logic 201 sends out a request 203 (e.g., a fetch request), along with metadata of the request 203—i.e., request_info 202. For example, the request_info 202 can include the address of the data to be fetched. The request_info 202 is transmitted to the request resource allocation/request handling logic 215, while the request 203 is intercepted by cancel probability generator logic 207. The cancel probability generator corresponds to a determination of whether a request to another level of memory or cache for data is likely to be canceled. In some embodiments, the cancel probability generator 207 includes a set predictor module that determines the likelihood of a hit or miss of a current level of cache that is analyzed. Accordingly, if there is a high likelihood that a current cache level has the needed data (a hit), then there is a high likelihood that the request_cancel 205 (to cancel the request 203) will be sent because the data was already located in the current level of cache analyzed and another request for the data in another level of cache/memory is not warranted. Alternatively, if there is a low likelihood that a current cache level includes the needed data (e.g., a miss), then there is a low likelihood the request_cancel 205 will occur because the data will need to be fetched in another memory or cache.

If the cancel probability generator 207 determines that there is a low probability that request cancel 205 will be sent (e.g., because there is a predicted miss in a current level of cache being analyzed), then another level of cache may automatically be queried (i.e., via the request_valid 209). The request_valid 209 fetch request may be automatically issued to the request resource allocation/request handling 215 regardless of whether the actual hit or miss data result is known (e.g., via a directory lookup). This automated process may occur because fetch requests may take a relatively long amount of time to process and when combined with the amount of time that it takes to determine the actual hit or miss information, it may delay the process even more. Accordingly, the request_valid 209 fetch request may be issued to the next level of cache or memory.

If the cancel probability generator 207 determines that there is a high likelihood that the request_cancel 205 will be sent (e.g., because there was a predicted hit in the current level of cache being analyzed), then the request to the request resource allocation 215 (i.e., the request_valid_late 211) may be delayed 213 (e.g., buffered, temporarily terminated, or discontinued, etc.). The request for the needed data within another level of cache may be delayed because of the high likelihood that a processor will locate the needed data in a current level of cache being analyzed. Accordingly, delaying 213 the request keeps the processing environment 200 from utilizing downstream resources (e.g., other levels of cache) if there is a high likelihood that they are not needed.

The request_cancel 205 request is generated by the request generation logic 201. The request_cancel 205 request is also delayed 213 so it can cancel the request_valid_late 211 request in time. For example, if the request_cancel request 205 was not buffered, and there was an unexpected actual hit/miss result, there may have already been an inaccurate cancel message transmitted to another cache level. Conversely, the delay 213 allows for an actual hit/miss lookup such that even if the result was unexpected, the delay action can be aborted in a buffer instead of re-generating a request-cancel 205 and/or reversing downstream actions already communicated to the request resource allocation 215. In embodiments, the request_cancel 205 is transmitted straight to the request resource allocation 215 so all non-delayed requests (e.g., request_valid 209) are canceled, as there is a low probability that the request will be canceled.

Figure 3:
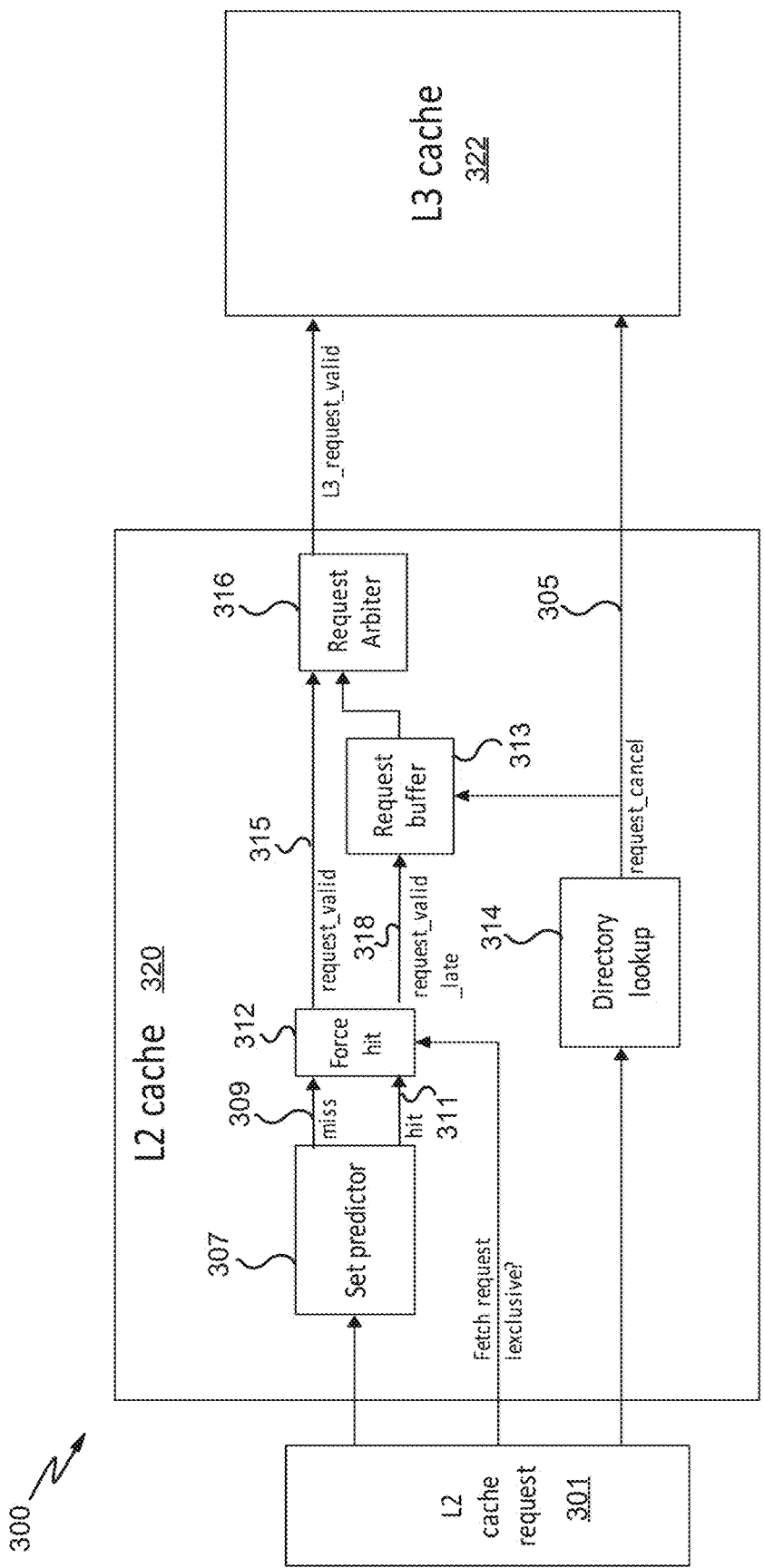
FIG. 3 is a block diagram of an example multi-level cache processing environment, according to embodiments.

FIG. 3 is a block diagram of an example multi-level cache processing environment 300, according to embodiments. In some embodiments, the environment 300 is a more detailed schema of the environment 200 of FIG. 2. In some embodiments, the environment 300 is implemented by the request interface module 126 of FIG. 1 and/or the pipeline 150 of FIG. 1. The environment 300 illustrates that there are 3 levels of cache. However, it is to be understood that the levels of cache are representative only in that there may be fewer or more levels of cache than represented in FIG. 3. In some embodiments, each level of cache represents another or different level of memory (e.g., main memory, non-volatile storage, etc.).

At operation 301 an L2 cache request is generated (e.g., by the request generation logic 201 of FIG. 2). In an illustrative example, the L2 request 301 may be a fetch request generated at L1 for a cache line in response to a "miss" result at L1. At a first time, the request 301 for data (e.g., a cache line) is sent to the set predictor at 307. The set predictor 307 predicts where the requested data can be found in L2. The set predictor 307 also predicts whether there will be a cache hit or miss at L2, as described in more detail below. The actual hit/miss is determined by a lookup in a directory lookup at 314. At the first time or substantially close to the first time or in parallel with the prediction of the set predictor 307, the request 301 may be transmitted to the directory lookup 314. The directory lookup 314 may be associated with increased fetch latency. Typically, a high quantity of delay is associated with using the directory lookup 314, whereas the set predictor 307 is associated with decreased latency. Accordingly, the prediction of the set predictor 307 may be initiated at the same time or close to the same time as initiation of the directory lookup 314. In some embodiments, the set predictor 307 is identical to the cancel probability generator 207 of FIG. 2.

In some embodiments, if the set predictor 307 predicts that there will be a miss 309, then a "request_valid" request 315 (e.g., another fetch request for the same data) may be intercepted by the request arbiter 316. If the set predictor 307 predicts that there will be a hit 311, then a "request_valid_late" request 318 may be transferred to the request buffer 313.

The request buffer 313 is used to initially delay or pause the request_valid_late request 318 (e.g., another request to L3 cache for the same data) from going to arbitration by the request arbiter 316. The request buffer 313 (or the delay 213 of FIG. 2) may be implemented in order to wait for the directory lookup 314 to be processed, as the directory lookup 314 will likely takes longer than the set predictor 307 to complete processing. Moreover, there is no need to initiate downstream processing to L3 cache 322 (e.g., transmit the L3_request_valid request) if it is likely that there will be a hit in L2 cache. Once the directory lookup 314 confirms that there is a L2 hit, the request_valid_late request 318 may be cleared from the request buffer 313 by the request_cancel 305 operation, so the request will not be processed downstream. The request_cancel 305 may or may not be communicated to L3 cache 322, but it should be ignored by the L3 cache because the request has been already cleared in the L2 cache. However, in the situation that the predicted hit was incorrect (i.e., there was a miss instead of a hit), the request_valid_late request 318 that has been buffered 313 may then be sent to the request arbiter 316. The request_valid_late request 318 may then be transmitted as the L3_request_valid request to L3 cache.

The request arbiter 316 is able to hold multiple pending fetch requests and determines whether to take or choose a "request_valid" request 315 or a buffered request from the request buffer 313. Regardless of whether the buffered request or the "request_valid" request 315 is selected, the request arbiter 316 translates the request into an "L3_request_valid" request to L3 cache 322 (another fetch request for the same data). In some embodiments, such as in a more general L2 cache design, multiple requests from previous L1 cache levels (e.g., the request_valid request and/or the request_valid_late request) can be pending in the request arbiter 316. This may increase the number of pending fetch requests being held in the request arbiter 316 waiting for arbitration to the next cache level.

In some situations it might be beneficial to override the result of the set predictor 307. In some embodiments, for example, the force module/logic 312 can force the prediction result to always indicate a cache hit (regardless of the set predictor results), when it is determined that a cache line is to be promoted from shared status to exclusive status. This means the cache line is already in the cache (cache hit) and does not need to be fetched from the next cache level. The term "exclusive" refers to a processor (or core) that has exclusive rights, or "exclusivity", to a particular cache line (i.e., the processor does not share access rights to a cache line with any other processor). In embodiments, a processor having exclusivity to a cache line can change the status of the cache line from "shared" to "exclusive". In some embodiments, while a cache line has exclusive status, a controlling processor can modify, in a local cache, data within that cache line. In some embodiments, the force logic 312 can alternatively force a cache miss prediction (regardless of the set predictor results). For example, if the L2 cache reaches a task threshold or is otherwise busy, it may be desirable to force a cache miss at L2 in order to fetch the same data from the L3 cache, which may not be associated with as many tasks.

Figure 4:
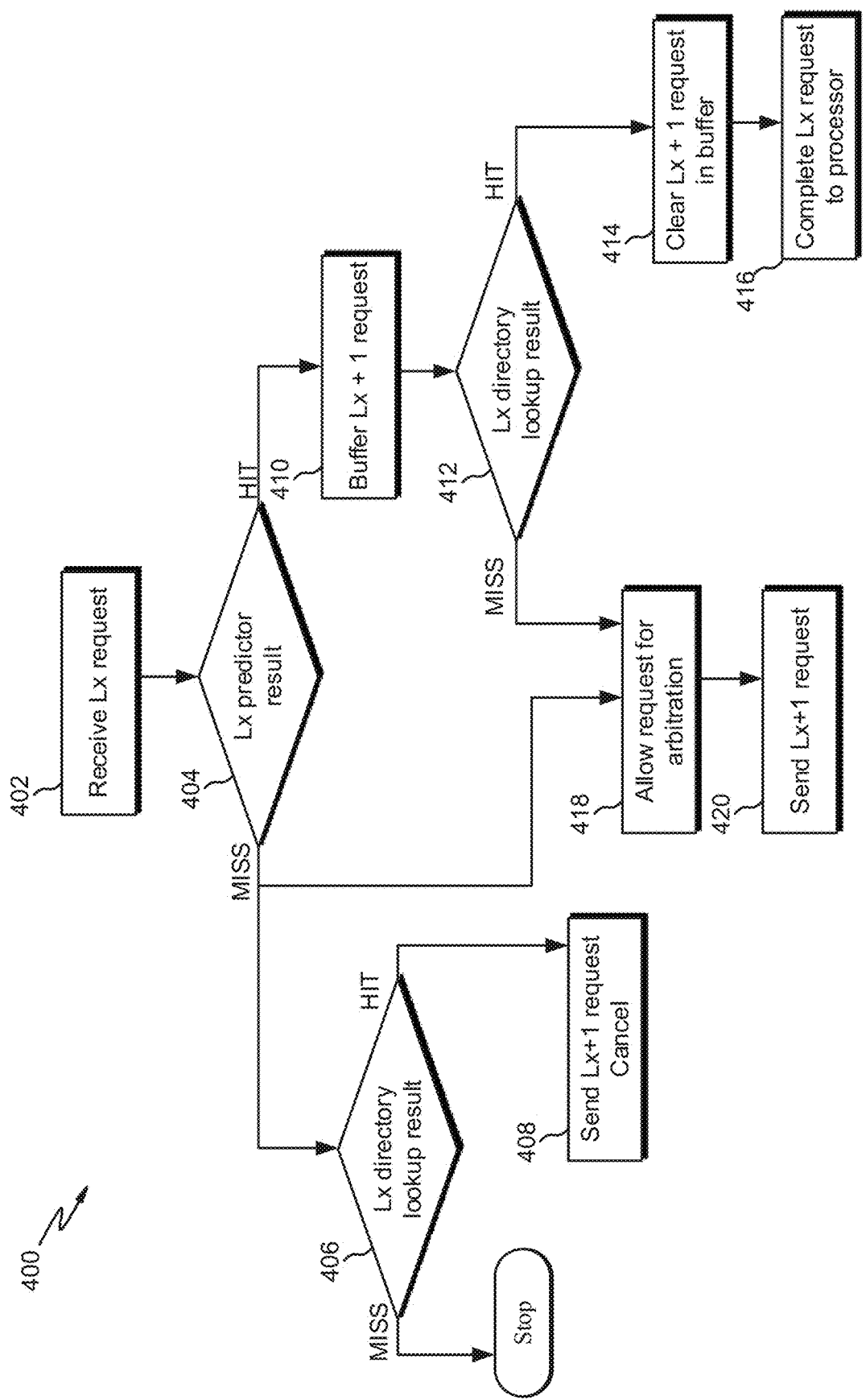
FIG. 4 is a flow diagram of an example process for selectively initiating downstream cache processing, according to embodiments.

FIG. 4 is a flow diagram of an example process 400 for selectively initiating downstream cache processing, according to embodiments. The process 400 may be performed by processing logic that comprises hardware (e.g., circuitry, dedicated logic, programmable logic, microcode, etc.), software (e.g., instructions run on a processor to perform hardware simulation), firmware, or a combination thereof.

At block 402, an Lx (e.g., L2 cache) request may be received. For example, a lower cache level, such as L1, may have incurred a cache miss for a first cache line. Consequently, the L1 may transmit and the L2 cache may receive a fetch request for the same first cache line. Per block 404, it may be determined what the Lx predictor result is. The Lx predictor result at block 404 may include a set predictor (e.g., the set predictor 307 of FIG. 3) that predicts or estimates whether there will be a cache hit or miss in the current level of cache being analyzed.

The Lx predictor may process predictions in any suitable manner. For example, in some embodiments, a pair of cache lines includes a steering bit table (SBT) and a rehash bit that are utilized to render prediction. In these embodiments, when fetching a cache line entry, the effective address is used to index into the actual cache. A prediction index is used to select a particular steering bit. The steering bits are accessed prior to the cache access. Each entry "steers" references to the appropriate cache block. A rehash bit is utilized to avoid examining another line when that line cannot contain the requested address. A rehash bit reduces the number of probes, which allows misses to be started earlier or reduces the time the cache is busy. Various types of prediction sources may be utilized, such as effective addresses (as described above), register contents and offset (e.g., using contents and offset to form a prediction address), register number and offset (combining register number and offset several cycles before cache access), and/or instruction and previous references (using address of the instruction issuing the reference and variants of the previous cache reference).

Per block 418, if it is predicted that there will be a cache miss, then the Lx request may be allowed to be transferred to arbitration (e.g., as processed by the request arbiter 316 of FIG. 3). Arbitration includes logic to determine whether to prepare a predicted miss (e.g., request_valid) or a buffered request (e.g., request_valid_late; block 410) for a next cache level request (e.g., L3_request_valid). Per block 420, the Lx cache sends an Lx+1 (e.g., another cache level) request to another level of cache (e.g., the L3_request_valid of FIG. 3). Generally, the processing time to predict the hit/miss result at block 404 and arbitration at block 418 is relatively faster than the Lx directory lookup result at block 406. Accordingly, the Lx+1 request at block 420 may generally occur before the Lx directory lookup at block 406. Therefore, regardless of when the Lx directory lookup result occurs at block 406, a speculative request is sent to the next level of cache for downstream processing because of the high latency of the Lx directory lookup and because of the high probability that a request will need to be sent out anyway after the actual Lx directory lookup result at block 406 is completed.

Per block 406, if the Lx predictor result predicted a miss at block 404, then a request may be initiated to lookup the actual hit/miss result in the Lx directory lookup at block 406 (e.g., using the directory 128 of FIG. 1; the directory lookup 314 of FIG. 3). In some embodiments, the arbitration at block 418 and/or the sending of the Lx+1 request at block 420 is done in parallel or substantially the same time as the initiation or beginning of the Lx directory lookup (not the result of the lookup). However, although these processes may be initiated in parallel, the latency to complete the lookup result at block 406 may be much longer than completing the arbitration at block 418. Accordingly, in some situations, a speculative Lx+1 request is sent at block 420 to another level of cache memory before the actual Lx directory lookup result at block 406. In some embodiments, the Lx directory lookup result at block 406 occurs via a table. The table may include memory addresses of cache lines currently stored in the Lx cache. Therefore, if the address of the cache line requested is found in the Lx directory, then there may be a "hit." Otherwise, if the address is not in the directory, then there may be a "miss".

Per block 408, if the actual directory lookup result at block 406 is a "hit," then an Lx+1 cancel request (e.g., the request_cancel 305 of FIG. 3) may be transmitted to the next level of cache in order to cancel the Lx+1 request at block 420. In some situations, although it may be predicted that there will be a miss at block 404, the actual result may be a hit at block 406. Accordingly, because the hit at block 406 may be unexpected, a cancellation of the speculative Lx+1 request may be needed to prevent the furthering of downstream processing, as the data needed has been located at the current level of cache being analyzed. If the Lx directory lookup result at block 406 is a miss, the process 400 may stop.

Per block 410, if it is predicted at block 404 that there will be a cache hit, then an Lx+1 request may still be generated but buffered or temporarily paused (e.g., the delay 213 of FIG. 2). A predicted cache hit at block 404 may indicate that an Lx+1 request is likely to be canceled. This request to the next cache/memory level may be delayed so as to avoid resource allocation in the next level(s) of memory. Typical systems may transmit a "cancel" indication to the next level of cache even though an actual hit or miss has not yet been determined. However, if the prediction turned out to be wrong, and there was actually a miss, the cancel indication signal may have been futile and have caused unnecessary latency because an Lx+1 request will have needed to be sent to the next level of cache to obtain the data. The Lx+1 request may be stored to a buffer at block 410. A buffer in the context of block 410 may be a temporary holding place for data to wait for other processes to occur first. For example, the buffer may be utilized to prevent the Lx+1 request from going to arbitration at block 418. The buffer may also be utilized to wait for the Lx directory lookup result at block 412.

Per block 412, while the Lx+1 request is buffered, the Lx directory lookup result is determined (e.g., by the directory 128 of FIG. 1). If the actual result is a hit at block 412, then per block 414, the Lx+1 request is cleared or emptied from the buffer. This effectively prevents the Lx+1 request from be transmitted to another cache memory. Therefore, the Lx+1 cache does not receive a request on its interface for a cache line, as the data is already located in cache Lx. Per block 416, the Lx request may be executed and completed such that data, for example, is returned to the calling processor from the Lx cache.

Figure 5:
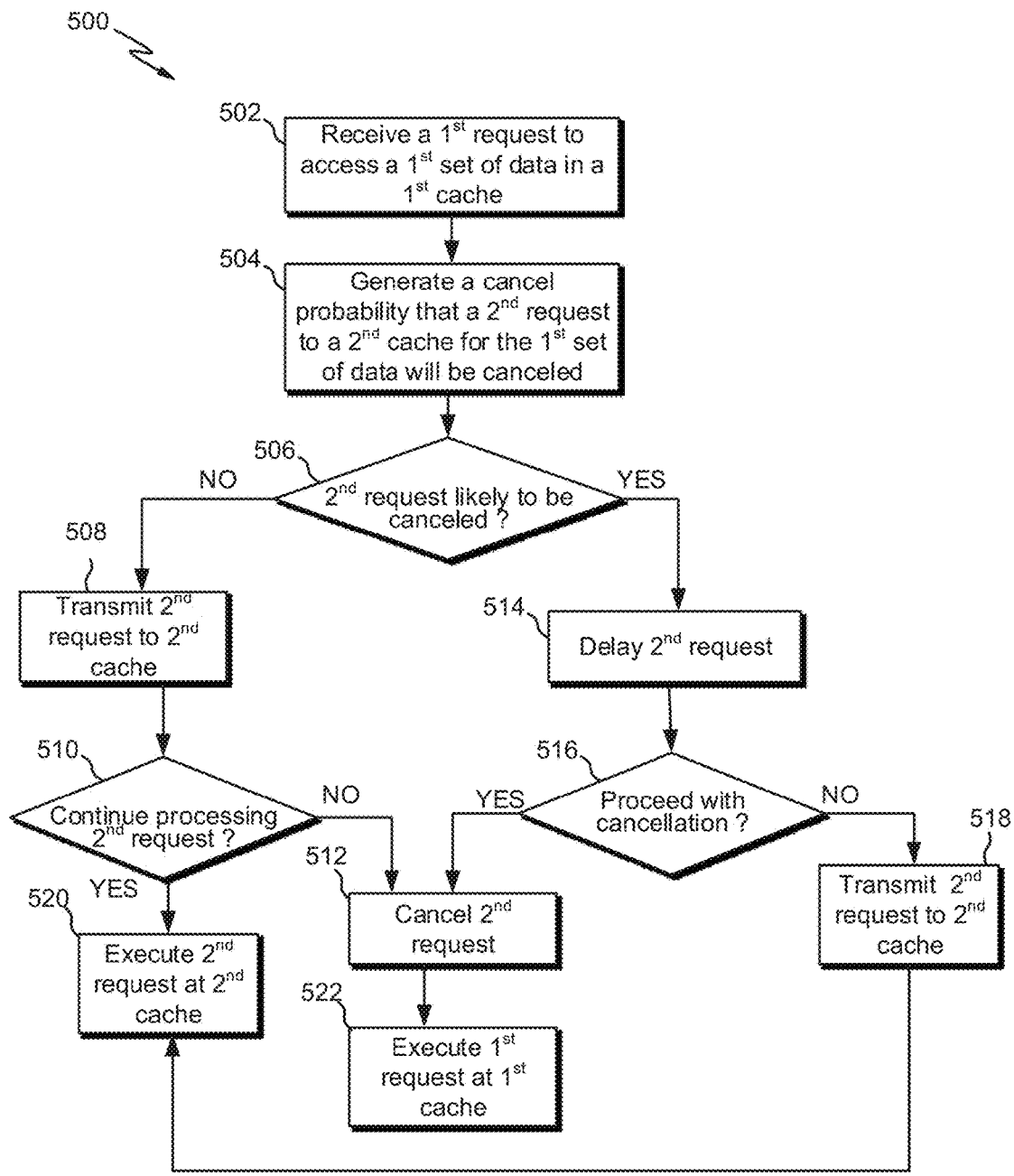
FIG. 5 is a flow diagram of an example process for selectively initiating downstream cache processing, according to embodiments.

FIG. 5 is a flow diagram of an example process 500 for selectively initiating downstream cache processing, according to embodiments. The process 500 may be performed by processing logic that comprises hardware (e.g., circuitry, dedicated logic, programmable logic, microcode, etc.), software (e.g., instructions run on a processor to perform hardware simulation), firmware, or a combination thereof.

At block 502, a first request may be received (e.g., from a processor and at a particular level of cache) to access (e.g., fetch) a first set of data in a first cache. For example, the request generation logic 201 of FIG. 1 may be included on a processor and may generate a request to be received by the first cache.

Per block 504, a cancel probability that a second request to a second cache for the first set of data will be canceled may be generated (e.g., by the cancel probability generator 207 of FIG. 2). Accordingly, determining a likelihood that the second request to the second cache for the first set of data will be canceled is made. For example, the second request to query the second cache may likely be canceled if there is already a cache hit at the first cache. Conversely, there may be no such likelihood of cancellation if there is a cache miss at the first cache. The cancel probability may occur in any suitable manner. For example, a threshold integer value or generated score estimate may indicate the likelihood. In some embodiments the score is based on various factors, such as a set predictor prediction result (prediction of whether there will likely be a cache hit or cache miss), the workload of a cache, whether a cache line is read-only or write-only, determinations made by the force logic 312 of FIG. 3, and/or the exclusive or shared status of a processor. For example, even if there is a cache hit at the first cache, there may be a threshold quantity of task handling (e.g., because the cache has a relatively large storage capacity and is busy) currently on the first cache such that a request to the second cache is warranted to decrease fetch latency. In another example, there may be a cache hit at the first cache, but the first set of data may be exclusive to another processor such that the current calling processor has to fetch the first set of data from the second cache instead. In some embodiments, instead or in addition to generating a "cancel" probability and likelihood as indicated in blocks 504 and 506, a "non-cancel" probability may be generated. The rest of the process 500 below block 504 helps to complete access to the first set of data based on the determining the likelihood that the second request to the second cache for the first set of data will be canceled.

Per block 506, based on the probability at block 504, it may be determined whether the second request to the second cache is likely to be canceled. If the second request is not likely to be canceled, this means that the second request will likely need to be transmitted to another cache/memory to retrieve the first set of data. Per block 508, if it is determined that the second request is not likely to be canceled, then the second request may be transmitted (e.g., by the request generation logic 201 of FIG. 2) to the second cache in order to access the first set of data. This may occur prior to a directory lookup indicating an actual cache hit or cache miss and in response to the determination at block 506.

Per block 510, it may be determined (e.g., via the cancel probability generator 207) whether to continue processing the second request. For example, it may be determined whether there is an actual cache miss in the first cache and whether the first set of data is exclusive to another processor. Continuing with this example, if there is an actual cache miss at the current level of cache being analyzed and the first set of data is not exclusive, then per block 520, the second request at the second cache may continue to be executed, as the request was initiated at block 508. Continuing with this example, if there is an actual cache hit (inconsistent with the likelihood result at block 506), then per block 512 the second request may be canceled such that the first cache may transmit a third request to the second cache to cancel the second request. And because there is a cache hit at the first cache, per block 522, the first request at the first cache may be executed or completed.

Per block 514, if it is determined at block 506 that the second request to the second cache for the first set of data will likely be canceled, then the second request may be delayed (e.g., the delay 213 of FIG. 2). The delaying of the second request may occur to at least prevent the transmitting of the second request to the second cache (e.g., because it is likely that there is a cache hit at the first cache and the first set of data is not exclusive to another processor). The second request may also be delayed for other reasons such as waiting for the actual cache hit/miss determination at block 516 and/or waiting for arbitration (e.g., the request arbiter 316 of FIG. 3).

Per block 516, it may be determined whether to proceed with the cancellation projected at block 506. For example, the block 516 determination may be based on whether there is an actual cache hit in the first cache and the read/write status of the first set of data. Per block 512, if the request should actually be canceled (e.g., if it determined that there is an actual cache hit in the first cache and/or the read/write status doesn't match the second request), then the second request is canceled to the second cache such that the second request is not transmitted to the second cache. For example, the second request may be buffered as part of the delay at block 514. In response to the determining of an actual cache hit at block 516, the second request in the buffer may be deleted or cleared. At block 522, the first request may be executed at the first cache.

Per block 518, if it is determined that the second request should not be canceled, then the second request may be transmitted to the second cache in order to access the first set of data in the second cache. Accordingly, at block 520 the second request at the second cache may be executed. In some situations, the first set of data will also not be located in the second cache, but rather a third or n level of cache or memory. In these cases, a similar process to the process 500 may occur with respect to the third or n level of cache.

Figure 6:
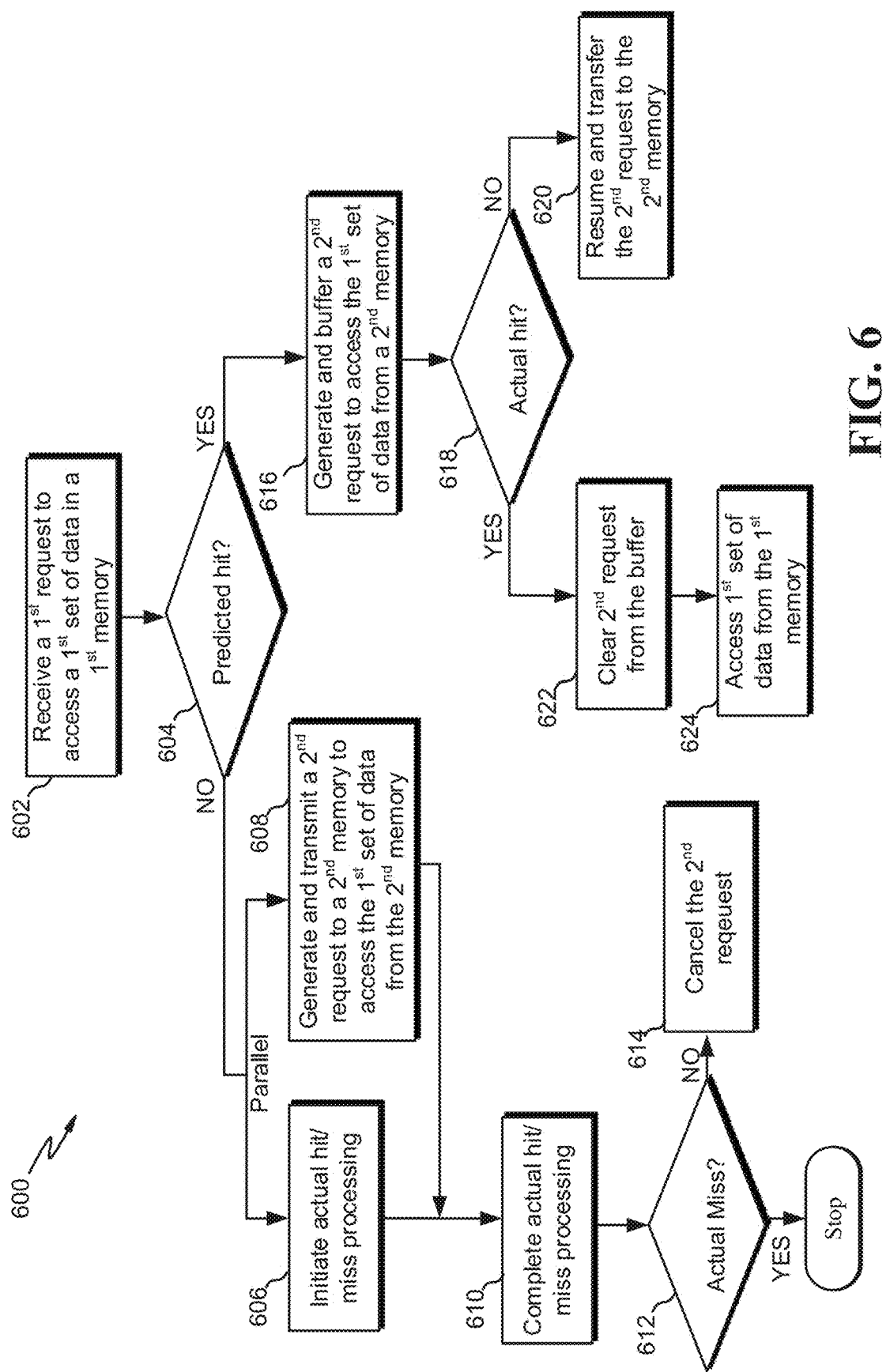
FIG. 6 is a flow diagram of an example process for selectively initiating downstream memory processing, according to embodiments.

FIG. 6 is a flow diagram of an example process 600 for selectively initiating downstream memory processing, according to embodiments. The process 600 may be performed by processing logic that comprises hardware (e.g., circuitry, dedicated logic, programmable logic, microcode, etc.), software (e.g., instructions run on a processor to perform hardware simulation), firmware, or a combination thereof.

At block 602, a first request (e.g., a fetch request) to access a first set of data in a first memory (e.g., L1 cache) may be received. Per block 604 it may be predicted (e.g., by the set predict logic 307 of FIG. 3) whether there will likely be a hit or a miss in the first memory. If it is predicted that there will not be a hit (e.g., there will be a miss), then blocks 606 and 608 may be performed in parallel or at substantially the same time.

Per block 606, actual hit/miss processing may be initiated (e.g., beginning a search for the first set of data in a directory). In some computing systems, completing actual hit/miss processing takes a relatively long quantity of time compared to block 608. For example, searching in a cache directory and locating/not locating the first set of data may take twice as long as block 608. Per block 608, a second request may be generated (e.g., by the request generation logic 201 of FIG. 2) and transmitted to a second memory (e.g., primary RAM) in order to access the first set of data from the second memory. Any one of the operations at blocks 608 and/or 616 indicates a generating of an action to facilitate access of the first set of data. The generating of the action occurs before completion of a determination of whether there is an actual hit or actual miss in the first memory.

Per block 610, the actual hit/miss processing may complete after it has been initiated at block 606 and after the transmission of the second request at block 608. For example, the completion may occur when the first set of data is located in a directory in the first cache or each entry in the directory was searched without locating the first set of data. Per block 612, it may be determined (e.g., via a directory) whether there was an actual miss (and/or hit). If there was an actual miss, then the process 600 may stop. Per block 614, if there was not an actual miss (e.g., there was a hit), the second request may be canceled since the first set of data was located in the first memory. Accordingly, any downstream processing by the second memory should be aborted.

Per block 616, if it was predicted at block 604 that there would be a hit then a second request may be generated and buffered (e.g., in the request buffer 313 of FIG. 3). The second request is generated in order to access the first set of data from a second memory if for some reason the first set of data cannot or should not be accessed from the first memory.

Per block 618, it is determined (e.g., via a directory) whether there is an actual hit (and/or miss) in the first memory. If there is not a hit (e.g., there is a miss), then per block 620 the second request may be resumed and transferred from the buffer to the second memory in order to access the first set of data. In some embodiments, the process 600 may then repeat for other levels of memory in order to access the first set of data.

Per block 622, if there was an actual hit for the first set of data at the first memory, the second request is cleared from the buffer. The second request is cleared or deleted from the buffer because with an actual hit in the first memory there is no need to transmit the access request for the first set of data in the second memory. Per block 624, in response to the hit, the first set of data is accessed from the first memory to complete the first request.

Figure 7:
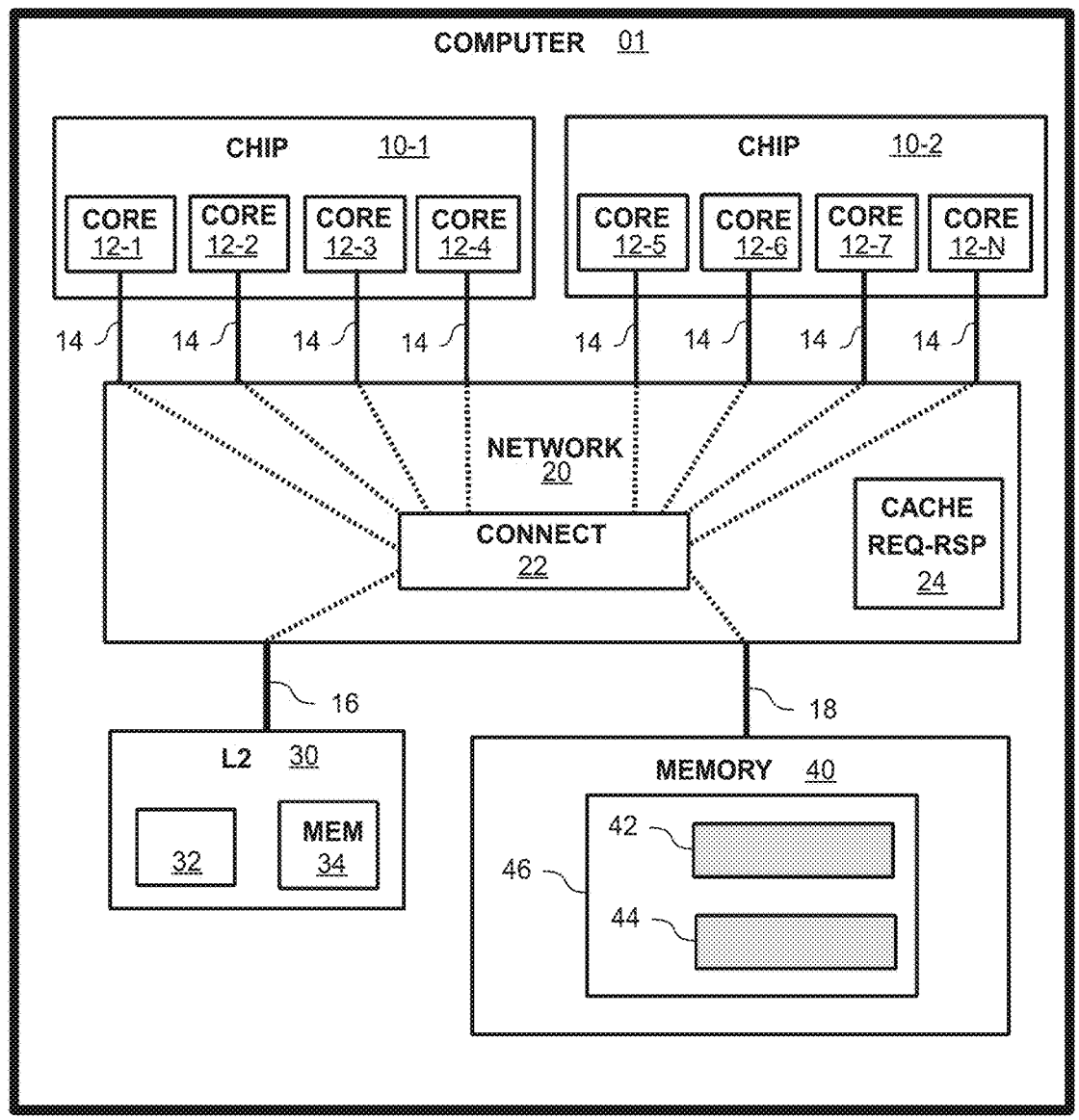
FIG. 7 is a block diagram of an example computing system, according to embodiments.

FIG. 7 is a block diagram of an example computing system, according to embodiments. FIG. 7 illustrates an example computer 01 having a plurality of processors interconnected to a cache and memory through a network 20 (e.g., an SMP network). In embodiments an SMP network can operate to exchange data and/or logic signals (e.g., status indicators, protocol commands and/or responses, etc.) between processors, caches, and/or memories. In some embodiments, an SMP network can be aware of particular memory locations stored in cache lines of various caches and/or processors.

As shown in FIG. 7, computer 01 includes processor CHIP 10-1 and CHIP 10-2 (hereinafter, "chips 10"), L2 30, and MEMORY 40 interconnected by NETWORK 20. CHIP 10-1 and CHIP 10-2 include processors CORES 12-1-12-N (hereinafter, "cores 12"). In some embodiments, some or each of the cores 12 are considered to be cores similar to core 110 of FIG. 1, and can include a local (e.g., L1) cache and a pipeline (e.g., pipeline 114 of FIG. 1).

Likewise, in some embodiments, L2 30 is a cache similar to cache 120 of FIG. 1, and can include a request interface module 126 and a memory. Caches included in cores 12 and L2 30, and the memory, can be organized into cache lines. Further, while L2 30 and MEMORY 40 are shown in FIG. 7 as singular elements, it would be appreciated by one of ordinary skill in the art that, in embodiments, L2 30 and/or MEMORY 40 can comprise various numbers and/or types of memories, and/or arrangements of memories, such as caches included in memories, caches and/or memories connected hierarchically, and/or caches and/or memories connected in parallel with each other. Accordingly, as used herein, "L1" further refers to any form of cache integrated into or contained within a processor, and "L2" further refers to any next level cache (or, combination or arrangement of caches) connected between a local cache and another, higher level cache (e.g., an L3) and/or a main memory.

As previously described, a memory and/or a cache can be organized as cache lines of a particular size. For example, MEMORY 40 can be organized as cache lines, and the cache lines can be, for example, 128 bytes in size. In embodiments, a processor (e.g., core 212-3) can include a cache, such as a local cache, and store a copy of data stored in a cache line of a memory, in the L1 cache. For example, MEMORY 40 includes cache line 46, which further contains data at locations 42 and 44. In embodiments, location 42 and/or 44 can be a location, in memory 40, of any unit of data ranging from a minimum size unit of data used by a processor (e.g., one byte) up to and including the amount of data comprising cache line 46 (e.g., 128 bytes).

In the example of FIG. 7, NETWORK 20 comprises CONNECT 22 and CACHE REQ-RSP 24. In embodiments, CONNECT 22 can operate to interconnect cores 12 with L2 30 and/or MEMORY 40. CACHE REQ-RSP 24 represents a cache management element of COMPUTER 01. In embodiments, a cache management element can process cache line fetch requests and/or cache line fetch responses. Embodiments of a cache management element, such as CACHE REQ-RSP 24, can additionally have awareness of which processors and/or caches have copies of cache lines of a memory (e.g., line 42 of MEMORY 40), status of such cache lines (e.g., shared or exclusive, or read-only or read/write), and/or whether (and, which) processors have incurred an intervention associated with a cache line fetch.

The example of FIG. 7 illustrates cores 12 as connected to CONNECT 22 by means of interconnects 14, L2 30 by means of interconnect 16, and MEMORY 40 by means of interconnect 18. In embodiments, CONNECT 22 and/or interconnects 14, 16, and 18 can comprise a bus, point-to-point links, and/or a cross bar switch, or any combination or arrangement of these. For example, CONNECT 22 can be a crossbar or packet switch and interconnects 14, 16, and 18 can be point-to-point links connecting to switch input and/or output connections to CONNECT 22. In alternative embodiments, CONNECT 22 can be a bus and interconnects 14, 16, and 18 can be bus connections to, and/or extensions of, a bus comprising CONNECT 22.

In other embodiments, CONNECT 22 and/or interconnects 14, 16, and 18 can comprise a combination of buses, links, and/or switches. For example, while not shown, it would be apparent to one of ordinary skill in the art that cores of a processor chip, such as 12-1-212-4 can interconnect amongst each other internal to CHIP 10-1—such as by means of buses, links, and/or switches—and that interconnect 14 can be a single connection between CHIP 10-1 and CONNECT 22. It would be further apparent to one of ordinary skill in the art that CONNECT 22, and the manner of connecting processor cores, chips, modules and/or caches and memories, can comprise a variety of types, combinations, and/or arrangements of interconnection mechanisms such as are known in the art, such as buses, links, and/or switches, and that these can be arranged as centralized, distributed, cascaded, and/or nested elements.

An SMP network, and/or component thereof, can control and/or maintain status of cache lines amongst the plurality of caches. To illustrate, in the example of FIG. 7, in embodiments CACHE REQ-RSP 24 is representative of cache request/response functions within an SMP network that can be associated with processing cache line fetch requests, responses, and/or interventions, among processors, caches, and/or memories interconnected by means of the SMP network. Such functions can include, for example, having awareness of the locations of cache lines among processors, caches, and/or memories, and/or having awareness of and/or participating in processing cache line fetches. In some embodiments, a processor can "snoop" the cache line requests of other processors and, in this way, can be aware of another processor having a copy of a missed cache line and, in some embodiments, can directly request a cache line fetch from another processor known to have a copy.

Embodiments can implement cache line request/response functions within a centralized unit, such as illustrated by CACHE REQ-RSP 24 in FIG. 7. In other embodiments, cache line request/response functions can distributed amongst processors, caches, and/or memories. In embodiments, one or more cores and/or chips can perform some cache line request/response functions, and one or more caches can perform other cache line request/response functions. Using the example of FIG. 7, one or more of cores 12, and/or chips 10, and/or one or more caches (e.g., local caches of cores 212 and/or L30) can perform cache line request/response functions. Cores 12 can each maintain status of cache lines located within respective local caches, and L2 30 and/or CACHE REQ-RSP 24 can also maintain awareness and/or status of cache lines cached in the various local caches of cores 12. Cores 12 and/or L2 30 can maintain status of cache lines located within respective local caches and/or L2 30, while CACHE REQ-RSP 24 can receive and/or process interventions associated with cache line fetches directed to processors among cores 12.

As used herein, "SMP network" refers interchangeably to an SMP network as a whole (e.g., NETWORK 220) and components of the SMP network (e.g., CACHE REQ-RSP 24), processors (e.g., chips 10 and/or cores 12), and/or caches (e.g., local caches of cores 12 and/or L2 30) used performing functions associated with cache line requests and responses. Continuing the example of FIG. 7, NETWORK 20 can route communications between cores 12, L2 30, and/or MEMORY 40, such as by means of CONNECT 22. NETWORK 20 can receive cache line fetch requests from the cores, cache line fetch responses, and/or intervention notifications and can route these among cores 12, L2 30, and/or MEMORY 40 (e.g., main memory). NETWORK 20 can have awareness of locations, within various caches, having copies of particular cache lines, and/or status of those cache lines, such as whether a particular cache line is shared amongst multiple processors and/or is subject to modification by a particular processor.

In embodiments, a processor can operate on data for one or multiple instructions using the cached copy of a memory cache line. For example, with reference to FIG. 7, CORE 12-1 can execute an instruction that uses data at location 42 in MEMORY 40 and can use the data at location 42 within a copy of cache line 46 in a local cache of CORE 12-1. In embodiments, if a processor incurs a cache miss for that cache line used in processing (e.g., executing) instructions, the processor can initiate a fetch of the cache line, and the fetch can obtain a copy of the cache line from another cache within the computing system, or from the memory. For example, with reference again to FIG. 7, if CORE 12-1 uses data in cache line 46 but does not already have a copy of cache line 46 in a local cache, CORE 12-1 can initiate a request to fetch cache line 46. In embodiments, initiating a fetch of a cache line can comprise a core communicating to an SMP network information about the cache line (e.g., a memory address and/or whether it is requested as a shared or an exclusive use or, alternatively, read-only or read/write). In alternative embodiments, initiating a fetch of a cache line can comprise a core communicating information about the cache line directly to another component of a system (e.g., another core, a cache, or a memory) known to have a valid copy of the cache line.

As previously described, in embodiments, under some circumstances (e.g., when a cache line has shared status), multiple processors in a computing system can cache a copy of a cache line in a respective local cache of the processors. In processing a cache line fetch request, the request can be satisfied by providing a copy of the cache line from one of the processors having a copy. For example, CORE 12-1 can request a copy of cache line 46 and, if a local cache of another core among cores 12, has a valid copy of the cache line, a copy of cache line 46 can be transferred from the local cache of that core to CORE 12-1 to satisfy the fetch request. However, if another core does not have a valid copy of cache line 46, but L2 30 has a valid copy, a copy of cache line 46 can be transferred from L2 30 to CORE 12A to satisfy the fetch request. If no caches in the computing system have a valid copy of cache line 46, a copy of cache line 46 can be transferred from MEMORY 40 to CORE 12A to satisfy the fetch request.

From the example of FIG. 7, it can be seen that transferring cache lines between processors, caches, and/or memories has an associated utilization of those elements and/or the elements interconnecting them (e.g., an SMP network). Transferring cache lines can have an associated "overhead" in terms of, for example, numbers of instruction cycles associated with latency to complete a cache line transfer, data transfer bandwidth or throughput, and/or computing bandwidth or throughput. In embodiments, overhead can include increased utilization of data buses, inter-processor links, and/or inter-memory links to transfer the cache line; increased instruction execution latency (awaiting completion of the transfer) for a requesting processor to complete execution of one or more instructions that use the cache line; and increased processor and/or cache utilization in processors to manage and perform the transfer.

Transfer latency (time required to receive a cache line following a fetch request) can increase based on which element (e.g., a particular cache or a memory) provides a copy of a cache line to satisfy a fetch request. For example, transferring a cache line from a core within a different chip, or from another cache not local to a processor, can have a much higher latency in comparison to transferring a cache line from a core with the same chip, or a cache more close (having fewer interconnections) to a requesting processor. High transfer latency can cause a processor to wait longer to perform an operation, or to complete an instruction, that uses data within that cache line, and in turn this can reduce processor performance. For example, fetching data not included in a local cache of a processor can correspond to many hundreds or thousands of processor execution cycles. Accordingly, it can be advantageous to processor and/or overall computing system performance to reduce cache line fetches associated with multiple processors using a cache line.

It is to be understood that although the computer 01 of FIG. 7 is illustrated as having a particular quantity of chips 10, cores 12, and other components, this quantity is representative only and accordingly there may be more or fewer components than illustrated. In some embodiments, some or each of the processes described in FIGS. 4, 5, and 6 may be implemented by the computer 01.

Figure 8:
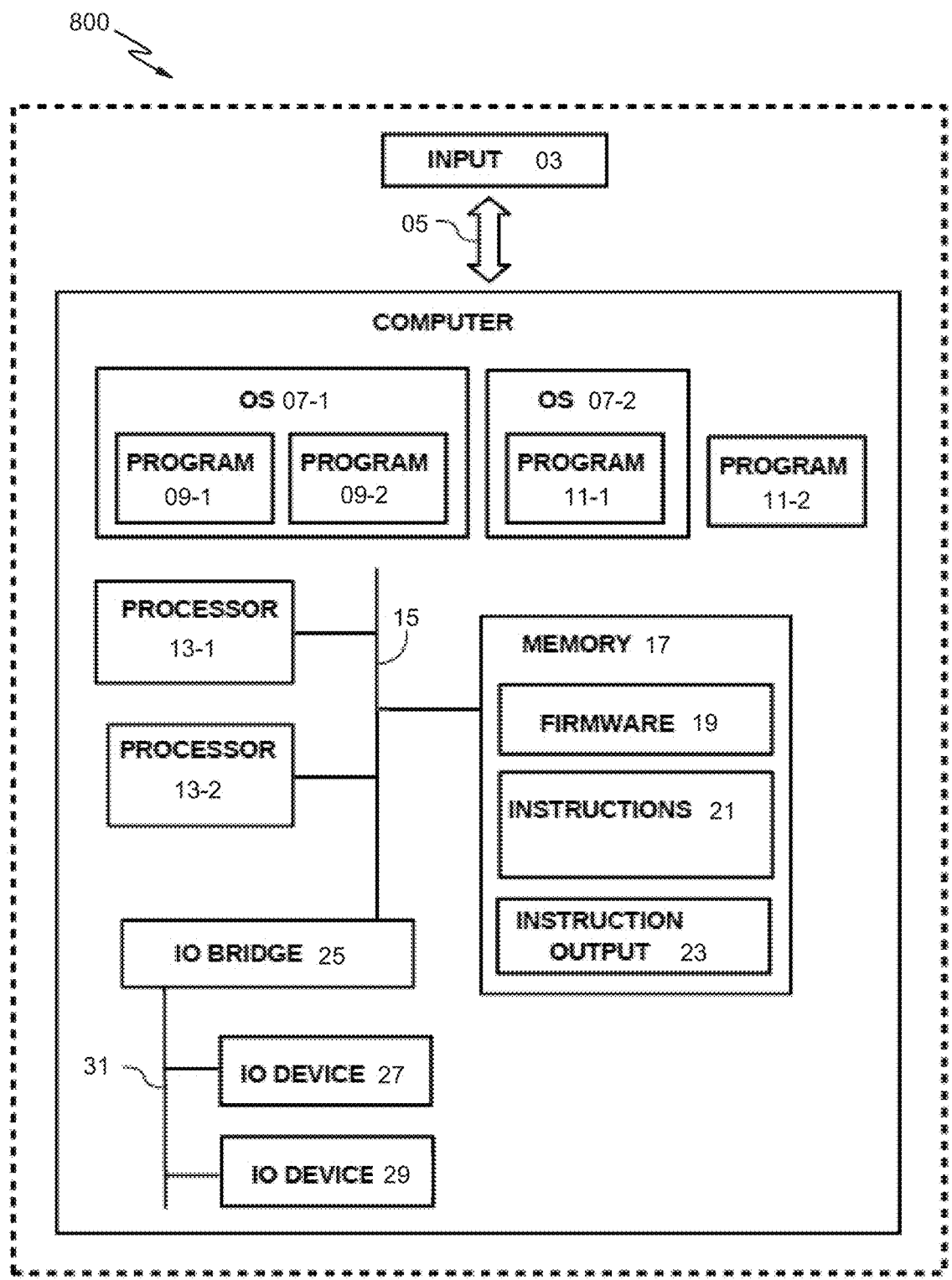
FIG. 8 is a block diagram of a computing system, according to embodiments.

FIG. 8 is a block diagram of a computing system 800, according to embodiments. As shown in FIG. 8, computer system 800 includes computer 53 having processors 13-1 and 13-2. In embodiments, the computer 53 can be or include the components as described in the computer 01 of FIG. 7 and vice versa. Likewise processors 13-1 and/or 13-2 can comprise processors such as previously described (e.g., CORE 110 of FIG. 1), a general purpose or a special purpose processor, a co-processor, or any of a variety of processing devices that can execute computing instructions.

FIG. 8 illustrates computer system 800 configured with interface 005 coupling computer 53 to input source 03. In embodiments, interface 05 can enable computer 53 to receive, or otherwise access, 05, input data via, for example, a network (e.g., an intranet, or a public network such as the Internet), or a storage medium, such as a disk drive internal or connected to computer 53. For example, input source 03 can be an SMP network, (e.g., NETWORK 20 in FIG. 7) or another processor, such as illustrated in a core among cores in FIG. 7, and input source 03 can provide requests to fetch a cache line or a data object, to computer 53, or otherwise enable computer 53 to receive a request to fetch a cache line or data object, to receive a cache line or a data object, using interface 05.

Interface 05 can be configured to enable human input, or to couple computer 53 to other input devices, such as described later in regard to components of computer 53. It would be apparent to one of ordinary skill in the art that the interface can be any of a variety of interface types or mechanisms suitable for a computer, or a program operating in a computer, to receive or otherwise access or receive a source netlist.

Processors included in computer 53 are connected by a memory interface 15 to memory 17. In embodiments a "memory" can be a cache memory, a main memory, a flash memory, or a combination of these or other varieties of electronic devices capable of storing information and, optionally, making the information, or locations storing the information within the memory, accessible to a processor. A memory can be formed of a single electronic (or, in some embodiments, other technologies such as optical) module or can be formed of a plurality of memory modules. A memory, or a memory module (e.g., an electronic packaging of a portion of a memory), can be, for example, one or more silicon dies or chips, or can be a multi-chip module package. Embodiments can organize a memory as a sequence of bytes, words (e.g., a plurality of contiguous or consecutive bytes), or pages (e.g., a plurality of contiguous or consecutive bytes or words).

In embodiments, the computer 53 can include a plurality of memories. A memory interface, such as 15, between a processor (or, processors) and a memory (or, memories) can be, for example, a memory bus common to one or more processors and one or more memories. In some embodiments, a memory interface, such as 15, between a processor and a memory can be point to point connection between the processor and the memory, and each processor in the computer can have a point-to-point connection to each of one or more of the memories. In other embodiments, a processor (for example, 13-1) can be connected to a memory (e.g., memory 17) by means of a connection (not shown) to another processor (e.g., 13-2) connected to the memory (e.g., 17 from processor 13-2 to memory 17).

The computer 53 includes an IO bridge 25, which can be connected to a memory interface, or (not shown), to a processor, for example. In some embodiments, an IO bridge can be a component of a processor or a memory. An IO bridge can interface the processors and/or memories of the computer (or, other devices) to IO devices connected to the bridge. For example, computer 53 includes IO bridge 25 interfacing memory interface 15 to IO devices, such as IO device 27. In some embodiments, an IO bridge can connect directly to a processor or a memory, or can be a component included in a processor or a memory. An IO bridge can be, for example, a PCI-Express or other IO bus bridge, or can be an IO adapter.

An IO bridge can connect to IO devices by means of an IO interface, or IO bus, such as IO bus 31 of computer 53. For example, IO bus 31 can be a PCI-Express or other IO bus. IO devices can be any of a variety of peripheral IO devices or IO adapters connecting to peripheral IO devices. For example, IO device 29 can be a graphic card, keyboard or other input device, a hard drive or other storage device, a network interface cards, etc. IO device 29 can be an IO adapter, such as a PCI-Express adapter, that connects components (e.g., processors or memories) of a computer to IO devices (e.g., disk drives, Ethernet networks, video displays, keyboards, mice, etc.).

A computer can include instructions executable by one or more of the processors (or, processing elements, such as threads of a processor). The instructions can be a component of one or more programs. The programs, or the instructions, can be stored in, and/or utilize, one or more memories of a computer. As illustrated in the example of FIG. 8, computer 53 includes a plurality of programs, such as program 09-1, 09-2, 11-1. A program can be, for example, an application program, an operating system or a function of an operating system, or a utility or built-in function of a computer. A program can be a hypervisor, and the hypervisor can, for example, manage sharing resources of the computer (e.g., a processor or regions of a memory, or access to an IO device) among a plurality of programs or operating systems. A program can be a program that embodies the methods, or portions thereof, of the disclosure. A program can be a program that embodies the methods, or portions thereof, of the disclosure. For example, a program can be a program that executes on a processor of computer 410 to perform one or more methods similar to example processes 400, 500, or 600 in FIGS. 4, 5, and/or 6. A program can perform methods similar to these methods modified, as would be understood by one of ordinary skill in the art, suitably for applications sharing data objects in a system such as illustrated in FIG. 1, FIG. 2, and/or FIG. 3.

Programs can be "stand-alone" programs that execute on processors and use memory within the computer directly, without requiring another program to control their execution or their use of resources of the computer. For example, computer 53 includes stand-alone program 11-2. A stand-alone program can perform particular functions within the computer, such as controlling, or interfacing (e.g., access by other programs) an IO interface or IO device. A stand-alone program can, for example, manage the operation, or access to, a memory. A Basic I/O Subsystem (BIOS), or a computer boot program (e.g., a program that can load and initiate execution of other programs) can be a standalone program.

A computer can include one or more operating systems, and an operating system can control the execution of other programs such as, for example, to start or stop a program, or to manage resources of the computer used by a program. For example, computer 53 includes operating systems (Os) 07-1 and 07-2, each of which can include, or manage execution of, one or more programs, such as OS 07-2 including (or, managing) program 11-1. In some embodiments, an operating system can function as a hypervisor.

A program can be embodied as firmware (e.g., BIOS in a desktop computer, or a hypervisor) and the firmware can execute on one or more processors and, optionally, can use memory, included in the computer. Firmware can be stored in a memory (e.g., a flash memory) of the computer. For example, computer 53 includes firmware 19 stored in memory 17. In other embodiments, firmware can be embodied as instructions (e.g., comprising a computer program product) on a storage medium (e.g., a CD ROM, a flash memory, or a disk drive), and the computer can access the instructions from the storage medium.

The example computer system 800 and computer 53 are not intended to limiting to embodiments. In embodiments, computer system 800 can include a plurality of processors, interfaces, and <inputs> and can include other elements or components, such as networks, network routers or gateways, storage systems, server computers, virtual computers or virtual computing and/or IO devices, cloud-computing environments, and so forth. It would be evident to one of ordinary skill in the art to include a variety of computing devices interconnected in a variety of manners in a computer system embodying aspects and features of the disclosure.

In embodiments, computer 53 can be, for example, a computing device having a processor capable of executing computing instructions and, optionally, a memory in communication with the processor. For example, computer 53 can be a desktop or laptop computer; a tablet computer, mobile computing device, or cellular phone; or, a server computer, a high-performance computer, or a super computer. Computer 53 can be, for example, a computing device incorporated into a wearable apparatus (e.g., an article of clothing, a wristwatch, or eyeglasses), an appliance (e.g., a refrigerator, or a lighting control), a vehicle and/or traffic monitoring device, a mechanical device, or (for example) a motorized vehicle. It would be apparent to one of ordinary skill in the art that a computer embodying aspects and features of the disclosure can be any of a variety of computing devices having processors and, optionally, memories and/or programs.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems and/or methods according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

Described below are particular definitions specific to the present disclosure:

"And/or" is the inclusive disjunction, also known as the logical disjunction and commonly known as the "inclusive or." For example, the phrase "A, B, and/or C," means that at least one of A or B or C is true; and "A, B, and/or C" is only false if each of A and B and C is false.

A "set of" items means there exists one or more items; there must exist at least one item, but there can also be two, three, or more items. A "subset of" items means there exists one or more items within a grouping of items that contain a common characteristic.

The terms "receive," "provide," "send," "input," "output," and "report" should not be taken to indicate or imply, unless otherwise explicitly specified: (i) any particular degree of directness with respect to the relationship between an object and a subject; and/or (ii) a presence or absence of a set of intermediate components, intermediate actions, and/or things interposed between an object and a subject.

A "module" is any set of hardware, firmware, and/or software that operatively works to do a function, without regard to whether the module is: (i) in a single local proximity; (ii) distributed over a wide area; (iii) in a single proximity within a larger piece of software code; (iv) located within a single piece of software code; (v) located in a single storage device, memory, or medium; (vi) mechanically connected; (vii) electrically connected; and/or (viii) connected in data communication. A "sub-module" is a "module" within a "module."

The terms first (e.g., first cache), second (e.g., second cache), etc. are not to be construed as denoting or implying order or time sequences. Rather, they are to be construed as distinguishing two or more elements. In some embodiments, the two or more elements, although distinguishable, have the same makeup. For example, a first memory and a second memory may indeed be two separate memories but they both may be RAM devices that have the same storage capacity (e.g., 4 GB). Moreover, a "first cache" and a "second cache," etc. is not to be construed as a particular level of cache (e.g., L1 and L2), but are to be construed as different caches in general.

As used herein, "processor" refers to any form and/or arrangement of a computing device using, or capable of using, data stored in a cache, including, for example, pipelined and/or multi-cycle processors, graphical processing units (GPUs), and/or neural networks. Also, as used herein, "computing system" refers to a computing system that employs processors utilizing data stored in one or more caches. However, this is not intended to limit embodiments, and it would be appreciated by one of ordinary skill in the art that embodiments can employ other varieties and/or architectures of processors within the scope of the disclosure.

What is claimed is:

1. A method comprising:
    receiving a first request to access a first set of data in a first cache;
    initiating a determination of whether there is an actual hit or actual miss in the first cache;
    generating a second request to a second cache to access the first set of data from the second cache;
    generating a cancel probability score for the second request, the cancel probability score indicating a probability that the second request will be canceled, wherein generating the cancel probability score includes predicting whether there will likely be a hit or a miss in the first cache, and wherein predicting whether there will likely be the hit or the miss in the first cache comprises:
       forcing a prediction of a hit in response to determining that a cache line in the first cache is to be promoted from shared status to exclusive status; and
       forcing a prediction of a miss in response to determining that the first cache is busy using a task threshold; and
    performing, based on the cancel probability score for the second request, a first action to facilitate access of the first set of data, the performing of the first action occurring before completion of the determination of whether there is an actual hit or actual miss in the first cache.

2. The method of claim 1, wherein the cancel probability score is based on at least one of the group consisting of the workload of the first cache, whether the first cache is read-only or write-only, and the exclusive or shared status of a processor coupled to the first cache.

3. The method of claim 1, wherein the performing the first action to facilitate access of the first set of data comprises:
    responsive to the cancel probability score indicating a low probability that the second request will be canceled, transmitting the second request to the second cache; and
    responsive to the cancel probability score indicating a high probability that the second request will be canceled, delaying the second request.

4. The method of claim 3, wherein delaying the second request includes storing the second request in a buffer in the first cache.

* * * * *